United States Patent

Takahashi

[11] Patent Number: 5,105,213
[45] Date of Patent: Apr. 14, 1992

[54] SELF-TIMER DEVICE

[75] Inventor: Kazunori Takahashi, Tokyo, Japan

[73] Assignee: Asahi Kogaku Kogyo Kabushiki Kaisha, Tokyo, Japan

[21] Appl. No.: 533,794

[22] Filed: Jun. 6, 1990

[30] Foreign Application Priority Data

Jun. 9, 1989 [JP] Japan .................. 1-67475[U]

[51] Int. Cl.⁵ .................................. G03B 9/64
[52] U.S. Cl. ........................ 354/239; 354/267.1
[58] Field of Search ............ 354/237, 238.1, 239, 354/266, 267.1, 264

[56] References Cited

U.S. PATENT DOCUMENTS 3,706,268 12/1972 Engelsmann et al. ......... 354/237 X
4,051,500 9/1977 Maas et al. .................... 354/239

FOREIGN PATENT DOCUMENTS 1135065 11/1968 United Kingdom .
1257566 12/1971 United Kingdom .
1469836 4/1977 United Kingdom .
2223597 4/1990 United Kingdom .

Primary Examiner—L. T. Hix
Assistant Examiner—Howard B. Blankenship
Attorney, Agent, or Firm—Sandler, Greenblum & Bernstein

[57] ABSTRACT

A shutter mechanism for a camera having a release member, which is arranged to be moved in a predetermined moving direction from an original position by depressing a shutter button, and a delay member. The delay member is movable relative to the release member and in parallel to the predetermined direction. The delay member is biased along them moving direction of the release member and is arranged to actuate the shutter mechanism of the camera when the delay member is located at a predetermined position. Simple, mechanical holding mechanisms temporarily stop both the release member and the delay member at other predetermined positions for a predetermined period before the delay member is released to actuate the shutter mechanism. Utilizing this delay mechanism, the camera can be made smaller and the manufacturing cost can be reduced.

10 Claims, 4 Drawing Sheets

FIG. I

SELF-TIMER DEVICE

BACKGROUND OF THE INVENTION

The present invention relates to a self-timer device used in cameras provided with a mechanical shutter having an automatic focusing function.

Generally, in cameras having an automatic focusing (hereinafter, abbreviated as "AF") function, the stroke of a shutter button is arranged in two stages so that when it is depressed to a first stage, an AF unit is actuated, and after the operation of the AF unit has been completed (that is, after focusing has been completed), the depression to the second stage is permitted to release the shutter.

With this arrangement, a failure due to the camera being out of focus, which can be caused by the shutter being released while the AF unit is in operation, is prevented.

This is also applicable when photographing is carried out using a self-timer, and the self timer can be usually actuated after the operation of an AF unit has been completed.

Nevertheless, in a case of cameras having a mechanical shutter, the mechanisms of a shutter and a self-timer are indispensably complicated and made larger in size in order to permit the self timer to be operated after the operation of an AF unit has been completed as described above, which prevents the cameras from being made smaller in size as a whole and the cost from being reduced.

That is, when the self timer is used, an operator cannot continuously depress a shutter button (in a state that the depression is effected to the first stage), and thus an arrangement is necessary to enable this state to be kept until the shutter is released after focusing has been completed.

SUMMARY OF THE INVENTION

It is therefore an object of the invention to provide an improved shutter mechanism in which a shutter release button can be held at a first stage during an auto-focusing operation, before the shutter is actuated.

Another object of the invention is to provide an improved self-timer device used in a camera provided with a mechanical shutter, with an automatic focusing function which can be simply arranged in a small size and produced at a low cost.

According to one aspect of the invention, there is provided a shutter mechanism, adapted to be positioned in a camera having a release member arranged to be movable along a predetermined direction from an original position therefor by depressing a shutter button, and a delay member relatively movable in parallel to said predetermined direction with said release member, said delay member being biased along a moving direction of said release member by a predetermined biasing force and being arranged to actuate a shutter mechanism of said camera in case that said delay member is located at a predetermined position, for locating said release member at another predetermined position during a predetermined period before said delay member is located at said predetermined position, said shutter mechanism comprising:

holding means for holding said delay member at a third predetermined position reversely designated to said predetermined position along said moving direction during said predetermined period;

timer means for counting said predetermined period;

releasing means for releasing the holding operation of said holding means after said predetermined period; and controlling means for controlling said release member having been located at said another predetermined position during said predetermined period so as to be located at said original position.

According to another aspect of the invention, there is provided a self-timer device comprising:

a release member arranged to be depressed by a shutter button and biased in a direction opposite to the depressing direction;

a delay member relatively movable in parallel to said release member and biased to an opposite direction of said depressing direction;

delay member stopping means for stopping the movement of said delay member at a predetermined position;

a timer mechanism for counting a predetermined period of time;

locking means for locking said timer mechanism in a set state, the locking operation being released by the movement of said release member to a position corresponding to said predetermined position;

release member stopping means for stopping said release member to prevent a returning operation thereof from said predetermined position in a state that the locking of said timer mechanism is released; and releasing means for respectively releasing a stopping operation of said delay member and said release member after said predetermined period counted by said timer mechanism becomes a predetermined value.

The release member and the delay member are moved in combination at the initial stage of the depression of the shutter button, the movement of the delay member is restricted by the delay member restricting means thereafter, and further the release member actuates the locking means to release the locking thereof with the timer mechanism, and the release member is restricted by the release member restricting means to prevent the return thereof, wherein at first when the restriction of the delay member is released by the delay member restriction releasing member moving in association with the timer mechanism, the delay member is moved following the release member by an urging force to actuate a shutter, and then the restriction of the release member is released by the release member restriction release means moving in association with the timer mechanism to permit the same to return to an initial state.

DESCRIPTION OF THE ACCOMPANYING DRAWINGS

DESCRIPTION OF THE EMBODIMENTS

Figure 1:
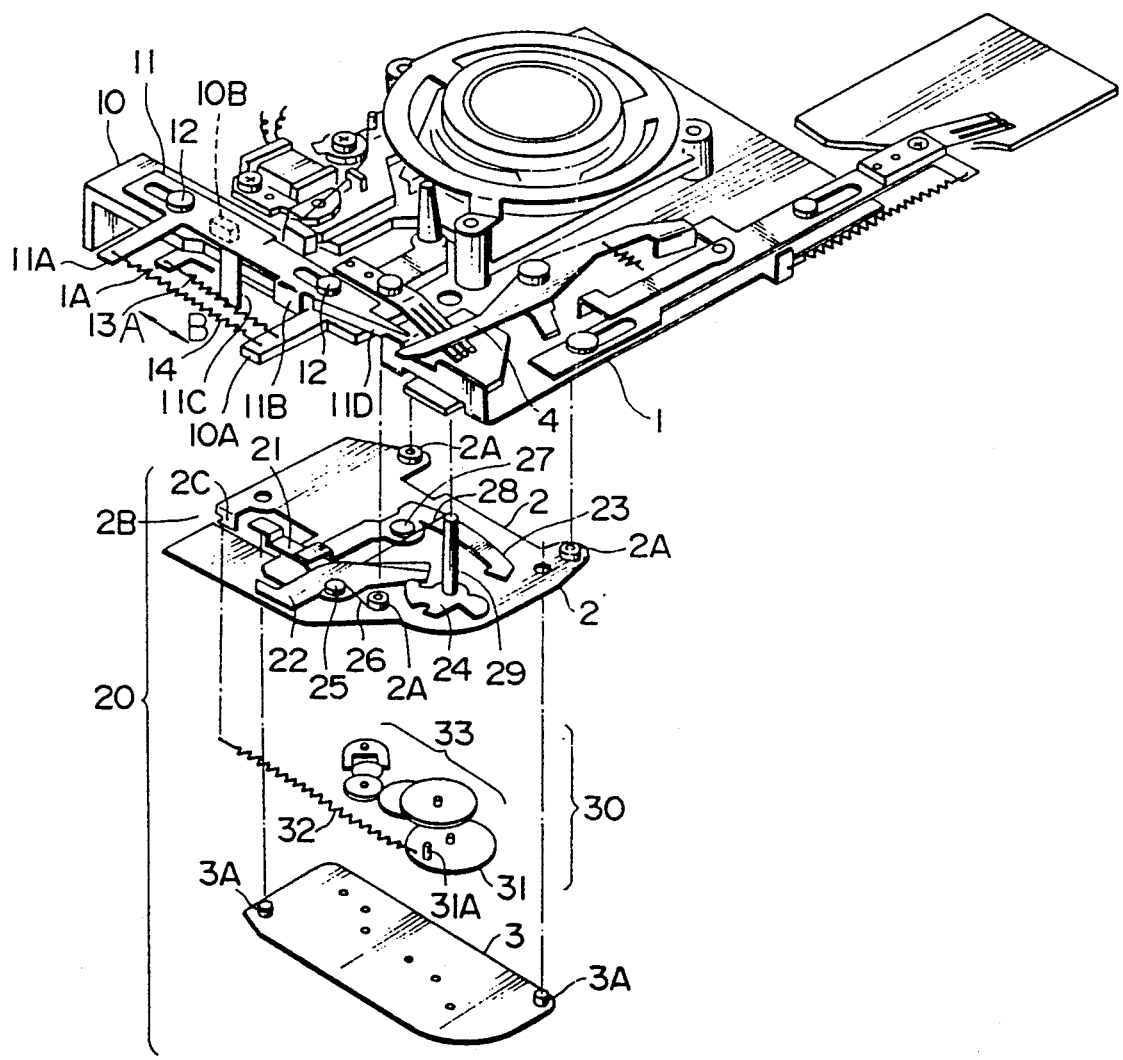
FIG. 1 is an exploded perspective view of a shutter button of a camera to which an embodiment of a self-timer device according to the present invention is applied and the portion of the self-timer device.

FIG. 1 is a partial perspective view of a shutter button of a camera to which an embodiment of a self-timer device according to the present invention is applied and the portion of the self-timer device.

The illustrated self-timer device comprises a release rod 10 and a delay member 11 serving as a release member which are upwardly and downwardly (along a direction shown by an arrow AB in the drawing, a direction indicated by "A" is upward direction and an opposite direction indicated by "B" is downward direction) slidingly disposed on the surface (upper surface in the drawing) at one end of a shutter base plate 1 and a self-timer mechanism 20 disposed on the back side of the location where the release rod 10 and the delay member 11 are disposed.

The release rod 10 is mounted on the shutter base plate 1 in such a manner that the two slots defined at the upper and lower portions thereof are slidingly engaged with the guide pins 12, 12 disposed at the two locations at the upper and lower portions of the shutter base plate 1, and can be slidingly moved upwardly and downwardly by a predetermined stroke by being guided by the guide pins 12, 12.

The delay member 11 is overlapped on the front surface of the release rod 10 with the slots defined therethrough slidingly engaged with the guide pins 12. The delay member 11 can also be slidingly moved by a predetermined stroke independent of the release rod 10 in the direction along which the guide pins 12, 12 are disposed (upward and downward directions).

A spring locking projection 10A is projected from the vicinity of the lower end of the release rod 10 toward a side direction and springs 13 and 14 are stretched between the spring locking projection 10A, and the locking hook 1A projected from the upper side of the shutter base plate 1 and a locking portion 11A projected from the upper side of the delay member 11 toward the side direction, respectively. The release rod 10 is urged upwardly of the shutter base plate 1 by the stretch biasing force of the spring 13 and the delay member 11 is urged downwardly of the release rod 10 by the stretch urging force of the spring 14.

Note that, in a free state, the lower edge surface of a stopper 11B, formed by being bent from the predetermined side edge of the delay member 11 toward the back surface, is held in abutment against the upper side edge surface of the spring locking projection 10A of the release rod 10 to thereby determine the positional relationship therebetween, and normally the delay member 1, and release rod are slidingly moved in combination in this state. Further only the delay member can be prevented from being lowered in such a manner that it is against the urging force of the spring 14. In addition, as described in detail below, the release rod 10 is depressed by a shutter button (not shown), which causes a depressing portion 11D of the delay member 11 moving in association with the release rod 10 to depress a shutter actuating member 4, whereby a shutter is released.

An actuating projection 10B for actuating the self-timer mechanisms 20 is projected from a predetermined location on the back side of the release rod 10 and the extreme end of the actuating projection reaches the inside of the self-timer mechanism 20 disposed on the back side through the side edge cutout of the shutter base plate 1.

A leg 11C having a predetermined width and bent a predetermined length toward the back side forms on a side edge at the substantial center of the delay member 11 and the extreme end of the leg 11C reaches to the inside of the self-timer mechanism 20, which is disposed on the back side through the side edge cutout of the shutter base plate 1, similar to the actuating projection of the release rod 10.

Further, the delay member 11 has the lower side edge bent toward the back side in a predetermined width to form the depressing portion 11D for depressing the shutter actuating member 4.

As described above, the self-timer mechanism 20 comprises an upper mother plate 2 and a lower mother plate 3 overlapped on the back side of the portion of the shutter base plate 1 on which the release rod 10 and the delay member 11 are mounted, a release rod restricting member 21, a delay restricting member 22, a self-timer actuating member 23, and a restriction release member 24 are disposed on the upper surface of the upper mother plate 2, i.e., the surface confronting the back surface of the shutter base plate 1, and a gear train and escape mechanism 30 with a timer function is interposed between the upper mother plate 2 and the lower mother plate 3.

The upper mother plate 2 is mounted on the back side of the shutter base plate 1 through bosses 2A having a predetermined height disposed on three predetermined positions on the upper surface thereof. A predetermined space is defined between the back surface of the shutter base plate 1 and the upper surface of the upper mother plate 2. Note that the extreme end surface of the actuating projection of the release rod 10 is set at a position higher, i.e., apart, a predetermined distance than the front surface of the upper mother plate 2 to be described later and the extreme end of the leg 11C of the delay member 11 is extended to a position where it interferes with the upper mother plate 2. However, a slit 2B is defined to the portion of the upper mother plate 2 interfering with the leg 11C in the direction along which the delay member 11 is upwardly and downwardly moved, and thus the extreme end of the leg 11C is inserted into the slit 2B, whereby it is not interfered with.

Further, bosses having a predetermined height are projected from two diagonal positions on the lower mother plate 3, the lower mother plate 3 is attached to the upper mother plate 2 through the bosses 3A, 3A, and a space in which the gear train and escape mechanism 30 is contained is defined therebetween.

Figure 2:
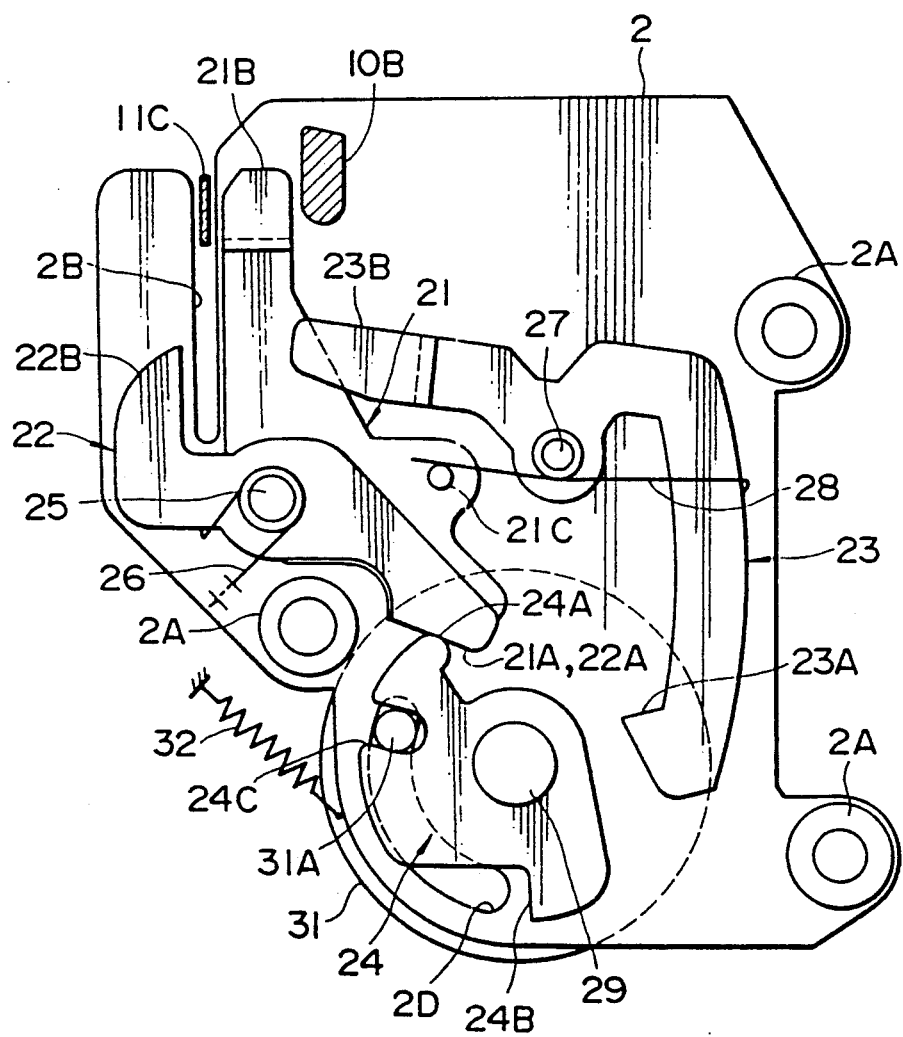
FIG. 2 is a plan view of an upper mother plate in a usual state of use.

As shown in FIG. 2 illustrating a plan view of the upper mother plate 2, the release rod restricting member 21 is mounted on the upper mother plate 2 so that it can be rotated about a shaft 25, the delay restricting member 22 is overlappingly mounted on the upper side of the release rod restricting member 21 so that it can be independently rotated about the same shaft 25, the restriction release member 24 is rotatively mounted at the position corresponding to the extreme end abutting portions 21A and 22A of the release rod restricting member 21 and the delay restricting member 22, and further the self-timer actuating member 23 is mounted with the extreme end locking claw 23A thereof corresponding to the rotating area of the restriction release member 24 so that it can be rotated about a shaft 27.

The release rod restricting member 21 has one end where the abutting portion 21A abutting against the restriction release member 24 is defined and the other end where the bent portion 21B is defined which is interfered with the actuating projection of the release rod restricting member 21 when the release rod restricting member 21 is rotated a predetermined angle, and one end of a torsion spring 28 wound around the shaft 27 by which the self-timer actuating member 23 is supported is held in abutment against a pin 21C disposed in the vicinity of the abutting portion 21A, whereby the release rod restricting member 21 is rotated clockwise by the torsion spring 28.

The delay restricting member 22 has one end where an abutting portion 22A similar to that of the release rod restricting member 21 abutting against the restricting release member 24 is defined and the other end where a fishhook-shaped stopper portion 22B is defined which is interfered with the moving area of the leg 11C of the delay member 11 to restrict the movement of the delay member 11 when the delay restricting member 22 is rotated a predetermined angle, whereby the delay restricting member 22 is rotated clockwise by a torsion spring 26 wound around the shaft 25.

Note that the rotation of the release restricting member 21 and the release restricting member 22 in a free state respectively caused by the urging forces of the torsion springs 26 and 28 are restricted in such a manner that they are abutted against the boss 2A in the vicinity of the abutting portions 21A and 22A, respectively.

The restricting release member 24 is mounted on the upper mother plate 2 so that it can be rotated about a rotating shaft 29, a locking portion 24A abutting against the abutting portions 21A and 22A of the release rod restricting member 21 and the delay restricting member 22 and an engaging portion 24B engaged with the extreme end locking claw 23A of the self-timer actuating member 23 are defined at substantially symmetrical positions with respect to the rotating shaft 29, and an engaging slit 24C is defined in the vicinity of the locking portion 24A. And, a drive pin 31A, which is disposed at the predetermined position of the first gear 31 of the gear train and escape mechanism 30, to be described later in the vicinity of the circumference of the surface thereof on the upper mother plate 2 side, is engaged with the engaging slit 24C passing through the upper mother plate 2, whereby the restriction release member 24 and the first gear 31 are rotated in synchronism. The hole of the upper mother plate 2 through which the drive pin 31A passes is defined as an arc-shaped slot 2D having a predetermined angle which does not prevent the rotation of the first gear 31 and the restriction release member 24. In addition, the rotating shaft 29 is extended to the front side and passes through the shutter base plate 1, and thus the rotation of the rotating shaft 29 causes the restriction release member 24 and the first gear 31 to be rotated to set a timer.

The self-timer actuating member 23 has a substantially inverted "L"-shape, is rotatingly supported by the shaft 27 in the vicinity of the bent portion thereof, and has one end having the locking claw 23A defined at the extreme end thereof which is engaged with the engaging portion 24B of the restriction release member 24, for restricting the rotation thereof, and an other end at bent actuating portion 23B. The actuating projection 10B of the release rod 10 abuts the bent activating portion 23B. The end of the torsion spring 28 is wound around the shaft 27, and abuts against the pin 21C of the release rod restricting member 21. Release rod restricting member 21 in turn is locked to the self-timer actuating member 23 in the vicinity of the bent portion thereof so that it is rotated clockwise by the urging force of the torsion spring 28 and the rotation thereof is restricted by a restricting member (not shown) so that the locking claw 23A is positioned at a predetermined position, which interfere with the rotating of the engaging portion 24B.

As described above, the gear train and escape mechanism 30 constitute a timer of the self-timer device, wherein a gear train 33, has a plurality of gears meshed together. A first gear 31 has, one end of a spring 32 attached to its outer circumference, with the other end of the spring locked to a hook 2C. The hook 2C is defined on the side edge of the upper mother plate 2. The first gear 31 is rotated clockwise by the stretch biasing force of the spring 32. The first gear 31 is rotated counterclockwise by a predetermined angle, against the stretch urging force of the spring 32, by the operation of the shaft 29. If the rotating force is removed, the first gear 31 is rotated by the stretch biasing force of the spring 32, and thus the rotating force rotates the gear train 33. To achieve a delay in returning the first gear to its initial state, a predetermined friction is applied to the rotation so that a predetermined period of time elapses for the first gear 31 to return to the initial state.

The self-timer device arranged as described above operates as follows.

The usual photographing state, shown in FIG. 2, is a state in which the self-timer is not used. The rotating position of the first gear 31 is located at an initial position by the stretch biasing force of the spring 32, and the restriction release member 24 having the engaging slit 24C which is engaged with the drive pin 31A disposed on the first gear 31 is located at the initial position by being restricted by the first gear 31.

At the time, the locking portion 24A of the restriction release member 24 is held in abutment to the abutting portions 21A and 22A of the release rod restricting member 21 and the delay restricting member 22, to restrict the release rod restricting member 21 and the delay restricting member 22 to the positions to which they are rotated by a predetermined angle counterclockwise against the biasing forces of the torsion springs 26 and 28.

In this state, the bent portion 21B of the released rod restricting member 21 is out of the moving area of the actuating projection 10B of the release rod 10 and the stopper portion 22B of the delay restricting member 22 is also out of the moving area of the leg 11C of the delay member 11. Therefore, the downward movement of the actuating projection 10B and the leg 11C of the delay member 11 are not restricted, and thus the downward movement of the release rod 10, i.e., the operation of the shutter actuating member 4, that is, the shutter release operation, can be achieved by the depression of a shutter button (not shown). Note that at the beginning of the downward movement of the release rod 10 caused by the depression of the shutter button, an AF unit is actuated by a mechanism (not shown).

Next, the operation when the self-timer is actuated will be described with reference to FIGS. 3 and 4.

Figure 3:
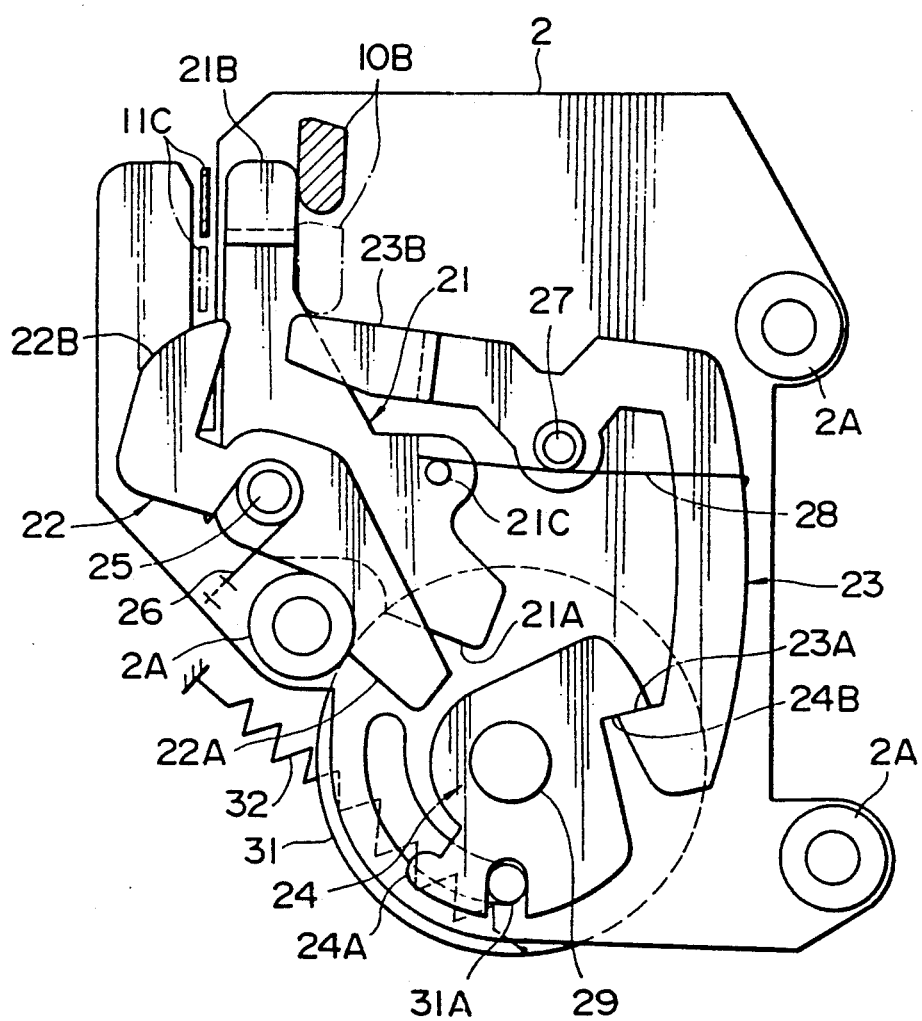
FIG. 3 is a plan view of the upper mother plate when a self-timer is set.
Figure 4:
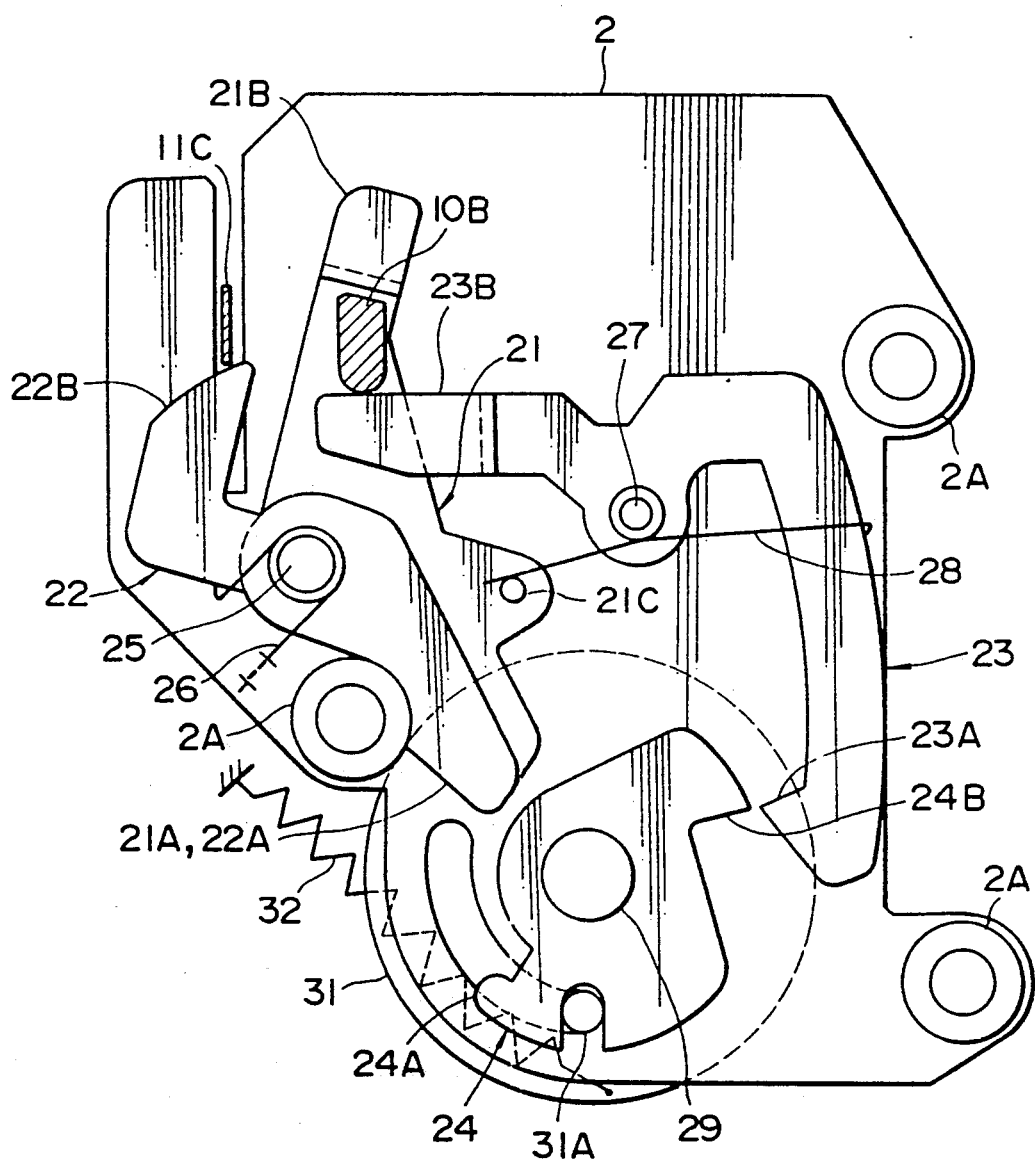
FIG. 4 is a plan view of the mother plate when the operation of the self timer begins.

FIG. 3 shows a state in which the self-timer is set. More specifically, the restriction release member 24 is rotated by a actuating member (not shown) by a predetermined angle, counterclockwise from the usual photographing state shown in FIG. 2, i.e., the first gear 31 is rotated against the stretch biasing force of the spring 32. The engaging portion 24B of the restriction release member 24 engages with the extreme end locking claw 23A of the self-timer actuating member 23, that is, the engaging portion 24B of the restriction release member 24 causes the self-timer actuating member 23 to be rotated once counterclockwise against the urging force of the torsion spring 28 and then is returned and engaged.

In this state, the depressed abutment of the abutting portions 21A and 22A of the release rod restricting member 21 and the delay restricting member 22 against the locking portion 24A of the restriction release member 24 is released, and, as a result, the release rod restricting member 21 and the delay restricting member 22 are made free and rotated by the biasing forces of the torsion springs 26 and 28, respectively. At the time, the delay restricting member 22 is rotated until it is in contact with the boss 2A and the stopper portion 22B interfere with the moving area of the leg 11C of the delay member 11, to cease the movement of the delay member 11. In addition, the rotation of the release rod restricting member 21 is ceased by the bent portion 21 thereof, which is held in abutment against the side of the actuating projection 10B of the release rod 10.

When the shutter button is depressed in the state shown in FIG. 3, the release rod 10 and the delay member 11 are lowered in combination at first. The actuating projection 10B and the leg 11C in the state are respectively illustrated by one dot lines in FIG. 3.

Here, since the stopper portion 22B of the delay restricting member 22 interfere with the moving area of the leg 11C of the delay member 11, the leg 11C is held in abutment against the stopper portion 22B, and the lowering of the delay member 11 ceases.

On the other hand, the release rod 10 depresses the self-timer actuating member 23 through the actuating projection 10B thereof, which is held in abutment against the actuating portion of the self-timer actuating member 23, and the self-timer actuating member 23 is continuously lowered in such a manner that it is rotated counterclockwise against the biasing force of the torsion spring 28 about the shaft 27.

When the self-timer actuating member 23 is rotated counterclockwise by the actuating projection 10B of the release rod 10, the engagement of the extreme end locking claw 23A thereof with the engagement portion of the restriction release member 24 is released so that the restriction release member 24 begins to be rotated clockwise by the stretch biasing force of the spring 32, that is, the timer begins operation.

At the same time, the actuating projection 10B of the release rod 10 moves from the bent portion 21B of the release rod restricting member 21 to the shaft 25 side to permit the release rod restricting member 21 to be rotated clockwise. As a result, the release rod restricting member 21 is rotated by the urging force of the torsion spring 28 to a position where it is held in abutment against the boss 2A so that the bent portion 21B enters the upper moving area of the actuating projection 10B, as illustrated in FIG. 4.

When a finger of the operator is released from the shutter button in this state, the release rod 10 is biased upwardly, i.e., it tends to want to return to its initial position prior to being depressed, by the spring 13 stretched between the shutter base plate 1 and the release rod 10, but this movement is prevented by the actuating projection 10B which is held in abutment against the bent portion 21B of the release rod restricting member 21, and thus the release member 10 is restricted in a depressed state. That is, the operation of the AF unit is continuously held in the state in which the shutter button is depressed.

When the first gear 31 of the gear train and escape mechanism 30, i.e., the restricting release member 24, is returned to the vicinity of the initial position in a predetermined period of time, the locking portion 24A of the restriction release member 24 is held in abutment against the abutting portions 21A and 22A of the release rod restricting member 21 and the delay restricting member 22, and the further rotation of the first gear 31 causes the release rod restricting member 21 and the delay restricting member 22 to be rotated counterclockwise against the urging forces of the torsion springs 26 and 28, respectively. Consequently the self-timer is returned to the usual state of use shown in FIG. 2.

As a result, first, the stopper portion 22B of the delay restricting member 22 retracts from the moving area of the leg 11C of the delay member 11, at the moment the delay member 11 is lowered by the biasing force of the spring 14, stretched between the delay member 11 and the release rod 10, and the depressing portion 11D thereof depresses the shutter actuating member 4, whereby the shutter is released.

More specifically, the shutter is released while the AF unit is in operation when the shutter button is depressed, whereby photographing by the self timer is carried out.

As described above, according to the present invention, a self-timer device used in cameras provided with a mechanical shutter having an automatic focusing function can be simply arranged in small size and thus the cameras can be made small in size and the manufacturing cost thereof can be reduced.

What is claimed is:

1. A shutter mechanism, adapted to be positioned in a camera having a release member arranged to be moveable along a predetermined direction from an original position therefor by depressing a shutter button and a delay member relatively movable in parallel to said predetermined direction with said release member, said delay member being biased along a moving direction of said release member by a predetermined biasing force and being arranged to actuate a shutter mechanism of said camera when said delay member is located at a predetermined position, said delay member locating said release member at another predetermined position during a predetermined period before said delay member is located at said predetermined position, said shutter mechanism comprising:

means for holding said delay member at a third predetermined position reversely designated to said predetermined position along said moving direction during said predetermined period, wherein said holding means comprises a stopping member whose predetermined portion is arranged to be located at said third predetermined position during said predetermined period for stopping a movement of said delay member against said predetermined biasing force;

means for counting said predetermined period;

means for releasing the holding operation of said holding means after said predetermined period, wherein said releasing means comprises a retracting member for retracting said stopping member from said third predetermined position after said predetermined period; and means for controlling said release member, said release member having been located at said another predetermined position during said predetermined period, to return said release member to said original position.

2. The shutter mechanism according to claim 1, wherein said controlling means comprises a biasing member for biasing said release member toward said original position, another stopping member whose predetermined portion is arranged to be located at said another predetermined position during said predetermined period for stopping a movement of said release member against a biasing force of said biasing member, said predetermined portion of said another stopping member being arranged to be retracted from said another predetermined position by said retracting member.

3. The shutter mechanism according to claim 2, wherein said stopping member and said another stopping member respectively comprise rocking members rockable about a predetermined shaft member between an operating position in which said predetermined portions are located at said another and third predetermined position and a non-operating position in which said predetermined portions are retracted.

4. The shutter mechanism according to claim 3, wherein said counter means comprises a gear train including a plurality of gears, at least one of said gears being arranged to be rotated about another predetermined shaft member in a predetermined angular velocity during said predetermined period, and wherein said retracting member comprises a plate member, arranged to be rotated with said one of said gears, having a contact portion to be contacted with other predetermined portions of said stopping member and said another stopping member opposite to said predetermined portions about said predetermined shaft member after said predetermined period with a predetermined rotating force thereof, whereby said predetermined portions of said stopping member and said another stopping member being respectively retracted from said another and third predetermined positions by rocking operations of said stopping member and said another stopping member after said predetermined period.

5. A self-timer device comprising:
a release member arranged to be depressed by a shutter button and biased in a direction opposite to the depressing direction;
a delay member relatively movable in parallel to said release member and biased to an opposite direction of said depressing direction;
delay member stopping means for stopping the movement of said delay member at a predetermined position;
a timer mechanism for counting a predetermined period of time;
means for locking said timer mechanism in a set state, the locking operation being released by the movement of said release member to a position corresponding to said predetermined position;
release member stopping means for stopping said release member to prevent a returning operation thereof from said predetermined position in a state that the locking of said timer mechanism is released; and
releasing means for respectively releasing a stopping operation of said delay member and said release member after said predetermined period counted by said timer mechanism becomes a predetermined value.

6. The self-timer device according to claim 5, wherein said releasing means comprises a stopping operation release member arranged to be moved in accordance with said timer mechanism for simultaneously releasing the stopping operations of said delay member stopping means and said release member stopping means.

7. The self-timer device accordance to claim 6, wherein said timer mechanism comprises a gear train including a plurality of gears, at least one of said gears being arranged to be rotated about a predetermined shaft member during said predetermined period, and wherein said stopping operation release member comprises a plate member arranged to be rotated with said one of said gears.

8. The self-timer device according to claim 7, wherein said release member stopping means and said delay member stopping means respectively comprise rocking plate members whose predetermined portions are arranged to be located in moving passes of said release member and said delay member for stopping the movements of said members when said timer mechanism is locked by said locking means, other predetermined portions of said rocking plate members being arranged to be contacted by said plate member with a rotating force thereof after said predetermined period, whereby said rocking plate members are rocked after said predetermined period and stopping operations for said release member and said delay member are released.

9. A release mechanism, adapted to be positioned in a device having at least two moving members arranged to be moved having a predetermined relationship with each other and mechanically biased along respective directions by biasing members, for releasing a stopping operation of at least one of said moving members, said release mechanism comprising:
means for holding said moving members at respective predetermined positions against biasing forces, wherein said holding means comprises rocking plate members whose predetermined portions are arranged to be located in moving passes of said moving members for stopping movements of said moving members and wherein at least one said moving member has another predetermined portion;
means for counting a period after the holding operation of said holding means is executed; and
means for controlling said holding means in such a manner that a holding operation of at least one of said moving members is released in case that a period counted by said counting means becomes a predetermined value, wherein said controlling means comprises a plate member having a contact portion arranged to be contacted at least with another predetermined portion of said one of said moving members with a predetermined push force when said counted period becomes said predetermined value, whereby at least one of said rocking plate members is rocked by said plate member and said predetermined portion thereof is retracted from said moving pass.

10. The release mechanism according to claim 9, wherein said counting means comprises a gear train having a plurality of gears, one of said gears being arranged to be rotated in a predetermined angular velocity and said plate member being rotated with said one of said gears.

* * * * *

UNITED STATES PATENT AND TRADEMARK OFFICE
CERTIFICATE OF CORRECTION

PATENT NO. : 5,105,213
DATED : April 14, 1992
INVENTOR(S) : K. TAKAHASHI

It is certified that error appears in the above-indentified patent and that said Letters Patent is hereby corrected as shown below:

At column 9, line 19 (claim 4, line 2), change "counter" to --- counting---.

Signed and Sealed this

Thirtieth Day of August, 1994

Attest:

BRUCE LEHMAN

*Attesting Officer*    *Commissioner of Patents and Trademarks*